J. W. Pettis,
Piston Packing,
Nº 13,917.                    Patented Dec. 11, 1855.
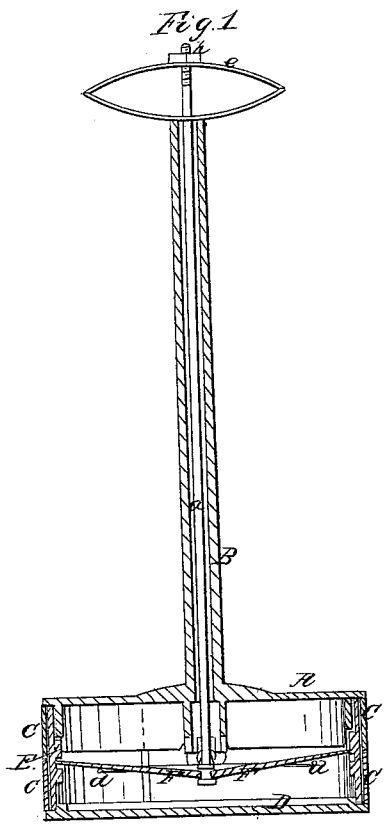
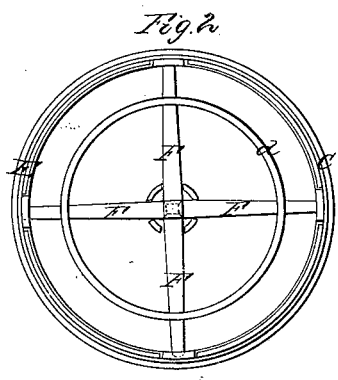

UNITED STATES PATENT OFFICE.

JOEL W. PETTIS, OF HILLSDALE, MICHIGAN.

PACKING PISTONS FOR STEAM-ENGINES.

Specification of Letters Patent No. 13,917, dated December 11, 1855.

*To all whom it may concern:*

Be it known that I, JOEL W. PETTIS, of Hillsdale, in the county of Hillsdale and State of Michigan, have invented a new and useful Improvement in the Metallic Packing of Pistons for Steam-Engines and for other Purposes; and I do hereby declare that the following is a full, clear, and exact description of the same, reference being had to the accompanying drawings, forming part of this specification, in which—

Figure 1, is a central section of a piston with my improvement applied and Fig. 2, a section of the same perpendicularly to its axis.

Similar letters of reference indicate corresponding parts in both figures.

This invention consists in a novel, simple and effective method of forcing out the packing rings to compensate for their wear.

To enable those skilled in the art to make and use my invention I will proceed to describe its construction and operation.

A, is the head or main plate of the piston which is secured firmly to the rod, B, C, C, are split packing rings, and D, is the follower or movable plate to be taken off for the purpose of adjusting or repairing the packing. These parts of the piston are or may be constructed in any of the well known modes, but I prefer to make the piston rod hollow as shown in Fig. 1.

E, is a split ring applied inside the packing rings.

F, F, are radial arms of which there may be three, four or more, the outer ends of which fit to suitable notches in the interior of the ring E, and the inner ends to notches in a central bearing which is movable in the direction of the center or axis of the piston. In the drawing this bearing consists of a central rod, *a*. The arms F, F, form an oblique angle with the center or axis of the piston rod. The central rod *a*, works through the hollow piston rod and is secured in place partly by the arms F, F, and partly by a nut *b*, at the top or extremity of the piston rod, the said nut having a spring *c*, between it and the rod. The direction of the obliquity of the angle which the arms, F, F, form with center or axes of the piston is such that the spring *c*, pulls them in a direction to form a right angle with the said center or axis and thus makes them act like toggle joints and gives them a tendency to expand or force out the ring, E, against the packing rings thus keeping them tight to the interior of the cylinder. By screwing up the nut *b*, the force exerted by the arms F, F, to cause the expansion of the packing rings may be increased. In the drawing the arms F, F, are connected together by a ring *d*, but that is simply a matter of convenience and by no means essential. There are other means by which the arms F, F, may be acted upon to expand the packing rings, as a movable center piece which may be set by taking off the follower, D, of the piston, but whenever it is practicable I prefer to use a hollow piston rod with a central rod *a*, and a spring *c*.

I do not claim the forcing out of the packing by means of radial arms within the piston when the said arms have only a sliding rectilinear movement produced by cones at the center as such have been heretofore used, and I consider that arrangement to be inferior to as more likely to get out of order than and not so easily adjusted as the arrangement of the arms to work as herein described; but

What I claim as my invention and desire to secure by Letters Patent is,

The arrangement and application of the arms F, F, substantially as herein described between the packing rings and a movable center bearing whether the said center bearing be movable to adjust or tighten the packing by means of a central rod passing through a hollow piston rod or by other suitable means.

JOEL W. PETTIS.

Witnesses:
R. ALAN,
S. T. SHERIFF.